United States Patent [19]

Araseki et al.

[11] 4,028,506
[45] June 7, 1977

[54] MAXIMUM VALUE TRACING CIRCUIT FOR DIGITIZED VOICE SIGNALS

[75] Inventors: Takashi Araseki; Kazuo Ochiai, both of Tokyo, Japan

[73] Assignee: Nippon Electric Company, Ltd., Tokyo, Japan

[22] Filed: Dec. 9, 1974

[21] Appl. No.: 530,620

[30] Foreign Application Priority Data

Dec. 12, 1973 Japan .......................... 48-141059
Mar. 25, 1974 Japan .......................... 49-33800

[52] U.S. Cl. .................... 179/170.2; 179/170.8; 307/351; 328/151
[51] Int. Cl.² .......................................... H04B 3/22
[58] Field of Search ............. 179/1 HF, 1 H, 1 VC, 179/170.2, 170.4, 170.6, 170.8, 1 SA, 1 SM, 81 A; 328/115, 116, 117, 150, 151; 307/235 A, 235 N, 235 J, 235 K; 235/92 CA

[56] References Cited

UNITED STATES PATENTS

| 3,508,158 | 4/1970 | Marchese | 328/117 |
| 3,596,011 | 7/1971 | Alexandrovich | 179/1 HF |
| 3,643,169 | 2/1972 | Klein | 328/150 |
| 3,660,603 | 5/1972 | Andersen | 179/1 VC |
| 3,725,585 | 4/1973 | Moniak et al. | 179/1 HF |
| 3,794,763 | 2/1974 | Boudewijns et al. | 179/1 HF |
| 3,823,275 | 7/1974 | La Marche et al. | 179/170.2 |
| 3,826,878 | 7/1974 | Bendel | 179/170.2 |
| 3,924,078 | 12/1975 | Bussey | 235/92 CA |

OTHER PUBLICATIONS

E. Fariello, "A Digital Echo Suppressor For Satellite Circuits," IEEE Transactions on Communications, Dec. 1972, pp. 1176–1181.

Primary Examiner—William C. Cooper
Assistant Examiner—Randall P. Myers
Attorney, Agent, or Firm—Ostrolenk, Faber, Gerb & Soffen

[57] ABSTRACT

A maximum value tracing circuit employed in echo suppressors and the like for selecting the peak values of digitized voice signals. The digitized value of a signal previously stored in a register is continuously compared with the present digitized value. The larger value of the compared signals is stored in the register after application of each clear signal to the register.

First and second maximum value tracing circuits of the type described may be employed in combination with a comparator-selector circuit for comparing the outputs of the first and second maximum value extraction circuits to produce a comparison output signal representative of the larger of the two compared outputs derived from the first and second maximum value extraction circuits, which output signal is utiized for providing reliable, high speed echo suppression.

3 Claims, 9 Drawing Figures

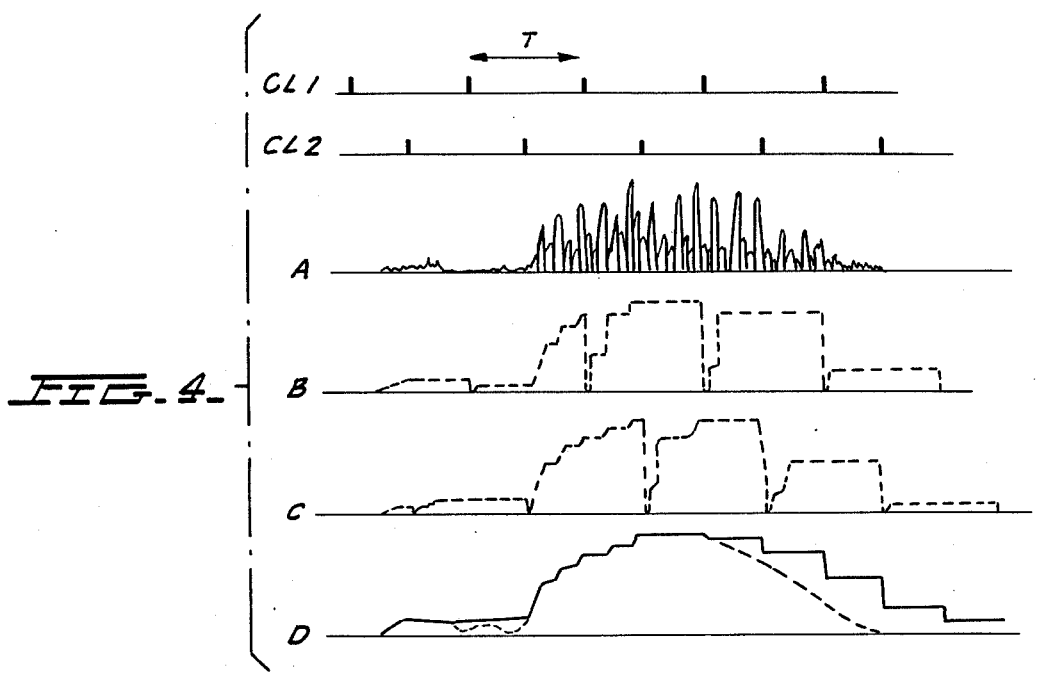
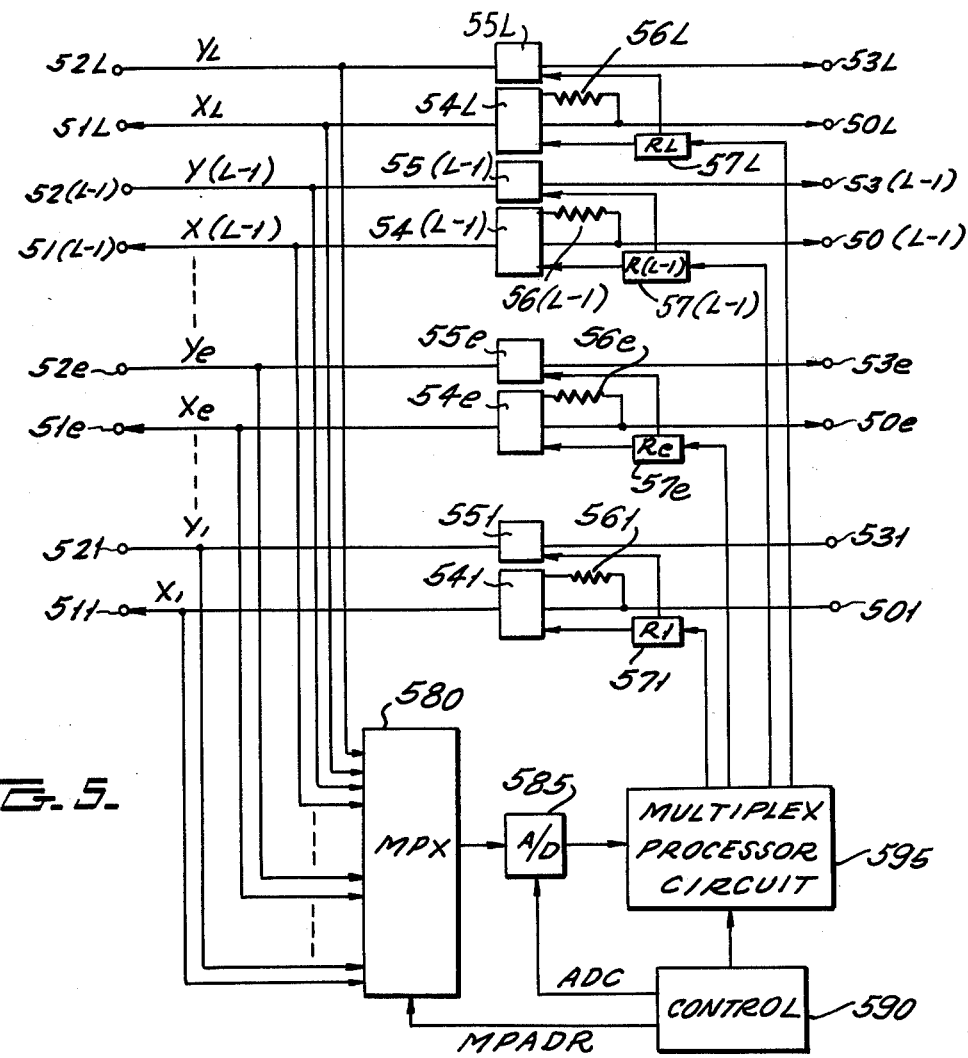

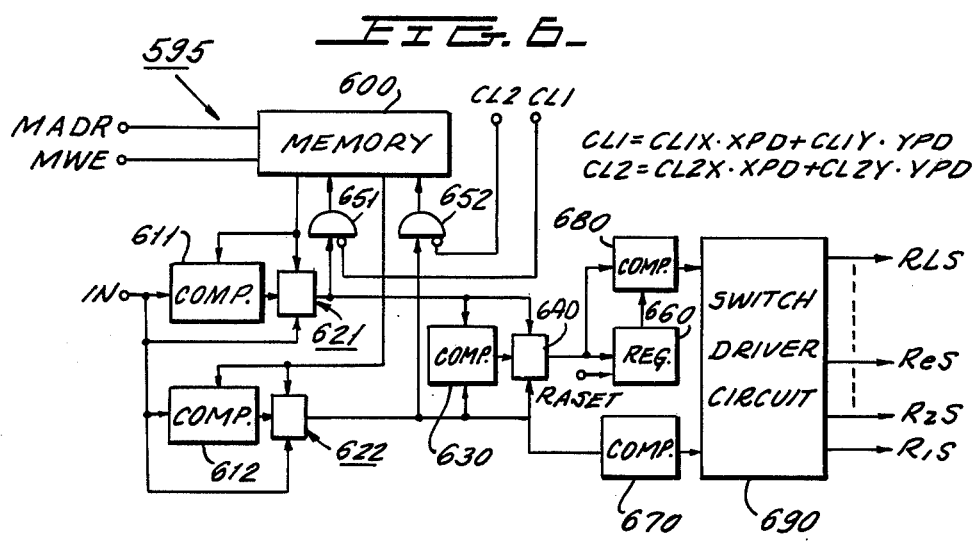
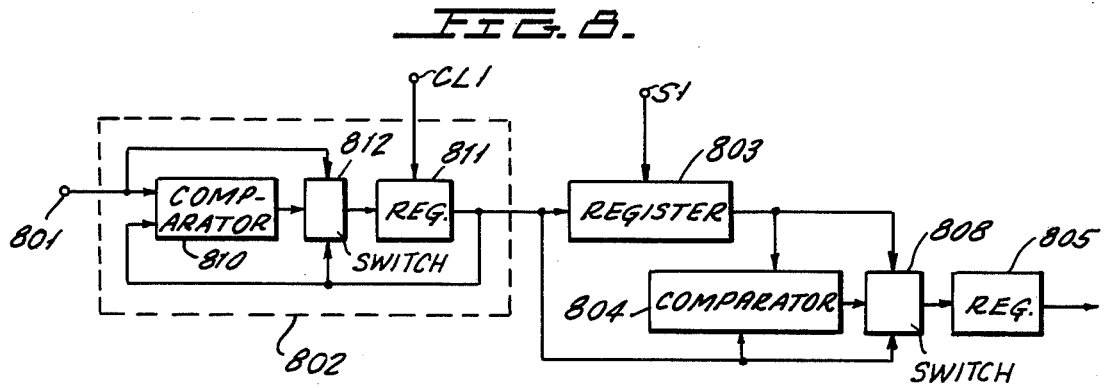
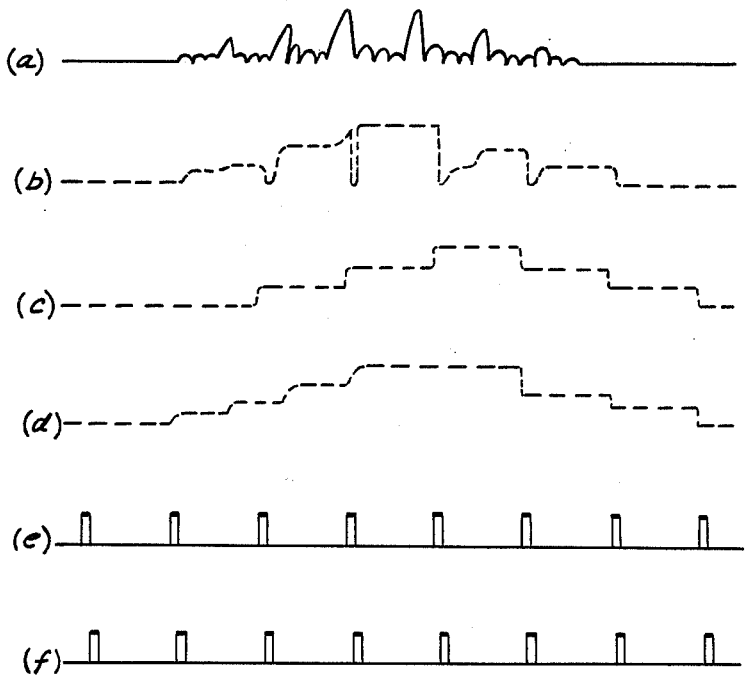

MAXIMUM VALUE TRACING CIRCUIT FOR DIGITIZED VOICE SIGNALS

BACKGROUND OF THE INVENTION

While the level extraction of voice signals is a technique required in many fields of art such as, for example, echo suppression in a long-distance trunk circuit or the extraction of voice signals within a given time interval in a voice analyzer-synthesizer system, etc., the present invention will be described hereunder mainly in connection with the case of its application to an echo suppressor.

Generally, in telephone circuits both two-wire circuits and four-wire circuits co-exist, and at junction point therebetween a hybrid coil is normally employed. However, if the mismatching of impedances should exist there, then reflection would be produced, which results in an echo in a long-distance telephone circuit and causes troubles in telephone conversation.

Heretofore, as means for dealing with such echo, an echo suppressor which monitors signal levels in four-wire circuits and which breaks a circuit that is not in use or which provides a signal attenuation to it, has been widely utilized throughout the world. Since the echo suppressors are provided in quantities substantially equal in number to the number of the circuits, the number of echo suppressors becomes very large, and accordingly, concentration of the echo suppressors is required. In association with the concentration of the echo suppressors, high reliability and stability are required, and miniaturization is also required. Conventional echo suppressors are typically composed of analog circuits, and so, if they were to be concentrated by themselves on a large scale, a great amount of time would be spent for maintenance and adjustment thereof and their miniaturization would also be difficult. In accordance with the recent establishment of digital techniques, replacement of an anlog circuit by a digital circuit having excellent stability and requiring no adjustment has been popularized; examples of such replacement are also evident in the art of echo suppressors.

Among the principle component elements of the echo suppressor, that element occupying the largest volume is a voice signal level detection circuit. Functions required for a voice signal level detector circuit to be used in an echo suppressor are that its detection speed is fast, and that once a level has been detected the detected level can be held for a predetermined period of time (for instance, several tens of seconds) without decaying abruptly, in other words, that the voice signal level detector circuit can have a hang-over time. The necessity for a hang-over time is due to the fact that a time delay although an echo path (from an output terminal on the receiver side to an input terminal on the transmitter side of an echo suppressor) is taken into consideration. Construction of a level detection circuit having the above-described functions and employing analog circuits can be realized in a relatively simple manner by employing an integrating circuit having different time constants for charging and discharging, respectively, provided that its stability and accuracy are disregarded. On the other hand, a level detection circuit for digitized voice signals in a digital echo suppressor in the prior art, is constructed of an integrating circuit and a counter circuit in combination. In such a case, miniaturization is hampered in that a large number of bits must be handled by the integrating circuit for obtaining the signal level at high precision, and that the counter circuit is needed. Furthermore, because of the need for integrating operations, it is difficult to enhance the detection speed.

Regarding voice signals, since their arithmetic mean values or root mean square (RMS) values can be deemed to be proportional to their peak values, it is possible to use a maximum value tracing circuit as the level detection circuit. By use of a maximum value tracing circuit, there exists a possibility of reducing the number of bits in a memory section (accumulator) in comparison to an integrating type of level detection circuit, while its response speed is very quick, and therefore, it is suitable for use in an echo suppressor.

An example of echo suppressors which make use of a maximum value tracing circuit was proposed in an article by E. Ferriello published on p.p. 1176 – 1181 of IEEE Trans. Communications (Dec. 1972). The proposed apparatus is an echo suppressor comprising a peak level detector for discriminating a peak level into one of a plurality of multilevels at an interval of 2 dB, and gate signal generators for counting a hang-over time provided equal in number to the number of the discriminated levels. However, the apparatus according to the disclosure in this article includes a large number of elements such as counters, gatecircuits, and the like, and accordingly it is not deemed suitable for miniaturization.

BRIEF DESCRIPTION OF THE INVENTION AND OBJECTS

One object of the present invention is to provide a maximum value tracing circuit for digitized voice signals that is adjustable in a simple fashion, and is stable and highly reliable.

Another object of the present invention is to provide a maximum value tracing circuit of a type that is compact and suitable for concentrated mounting.

According to the present invention, there is provided a maximum tracing circuit comprising a first maximum value extraction circuit and a second maximum value extraction circuit having a common input and individual clear signal input terminals, a comparator-selector circuit having its input connected to the output of said first and second maximum value extraction circuits and adapted to selectively emit at its output the larger value of these two input values, and means for supplying clear signals to the respective clear input terminals of said first and second maximum value extraction circuits in a different phase relationship.

According to the present invention, there is further provided a maximum value tracing circuit comprising a maximum value extraction circuit for extracting a maximum value of an input digitized voice signal in a time interval extending from the time point when a clear signal is applied to an arbitrary time point, a register for storing an output value of said maximum value extraction circuit at the time point when said clear signal is applied, and a comparator-register circuit for comparing the output value of said maximum value extraction circuit with an output value of said memory circuit and for storing the larger of these two output values.

A maximum value tracing circuit for digitized voice signals according to the present invention comprises two maximum value extraction circuits, the time intervals in which the maximum value is to be extracted being selected in the respective maximum value extraction circuits so as to partly overlap with each other, and by selecting a larger one of the output values from these two maximum value extraction circuits a variation of a maximum value of an input digital signal within a short period of time is traced. In view of the fact that such a maximum value tracing circuit of analog type employing charging and discharging circuits tried to obtain envelope values of a signal waveform, or in other words the so-called peak levels of a waveform, the maximum value tracing circuit according to the present invention is simplified in circuit arrangement by employing a method of and circuitry for tracing a maximum value of a waveform within a short period of time, because envelope values are a series of peak values of a waveform within a short period of time.

The problem, i.e., if a maximum value of an input waveform should be successively traced starting from a given time point by means of only one maximum value extraction circuit, a small value which fails to reach the envelope value of the input signal waveform would be obtained as an output of the maximum value extraction circuit for a little while just after the given time point, can be obviated by employing two maximum value extraction circuits arranged in the above-described manner.

With a circuit for continuously tracing a maximum value of an input digitized voice signal by applying the same input signal to two maximum value extraction circuits having different starting times for extraction as has been generally described above, then even in the case where only one maximum value extraction circuit is provided, a maximum value tracing circuit having a similar function can be obtained by adding one register circuit. In this latter type of maximum value tracing circuit, an output value of the maximum value extraction circuit similar to that used in the former type of system which affords a maximum value within a given time region defined by external signals and an output value of the memory circuit which stores the output value of the same maximum value extraction circuit just before it has been cleared at the last time, are compared and selected in a comparator circuit to provide the larger of the two values at its output. Since this memory circuit stores the maximum value in the time interval just prior to the time interval in which the maximum value extraction circuit involves renewed contents in response to the input signal, by selecting the larger value of the value stored in this memory circuit and the output value of the maximum value extraction circuit which renews its contents from one moment to the next, a maximum value of an input signal during a predetermined short period of time can be continuously obtained.

Two types of maximum value tracing circuits according to the present invention have been referred to and their operations have been briefly explained above. In either one of these systems, the aforementioned hang-over time can be freely selected by varying the time interval between clear operations for the maximum value extraction circuit or circuits. Since the maximum value tracing circuit according to the present invention is simple in structure and designed as a circuit operable in an entirely digital manner, it is small in size, light in weight and yet has excellent operating stability and a high precision of level tracing. Furthermore, its response speed is fact because the need for an integrating circuit has been obviated. Accordingly, this maximum value tracing circuit is favorable for use as a level de-
tector circuit for an echo suppressor, and especially in cases where it is applied to a multiplex circuit, it gives remarkable advantages in contrast to the conventional maximum value tracing circuits.

BRIEF DESCRIPTION OF THE FIGURES

Now the invention will be described in more detail with reference to the accompanying drawings, in which:

FIG. 4 is a diagram showing the signals appearing at various points in the embodiment shown in FIG. 2, FIG. 5 shows one employing of an echo suppressor for processing multiplex digitized voice signals employing a maximum value tracing circuit for digitized voice signals, FIG. 6 is a detailed block diagram of a multiplex digitized voice signal processor circuit in the echo suppressor shown in FIG. 5, a principal part of said processor circuit comprising a maximum value tracing circuit for digitized voice signals to be used for multiplex processing according to the present invention, FIG. 8 shows a second preferred embodiment of a maximum value tracing circuit for digitized voice signals according to the present invention, and FIG. 9 is a diagram of waveforms representing the signals appearing at various points in the embodiment shown in FIG. 8.

DETAILED DESCRIPTION OF THE INVENTION

Figure 1:
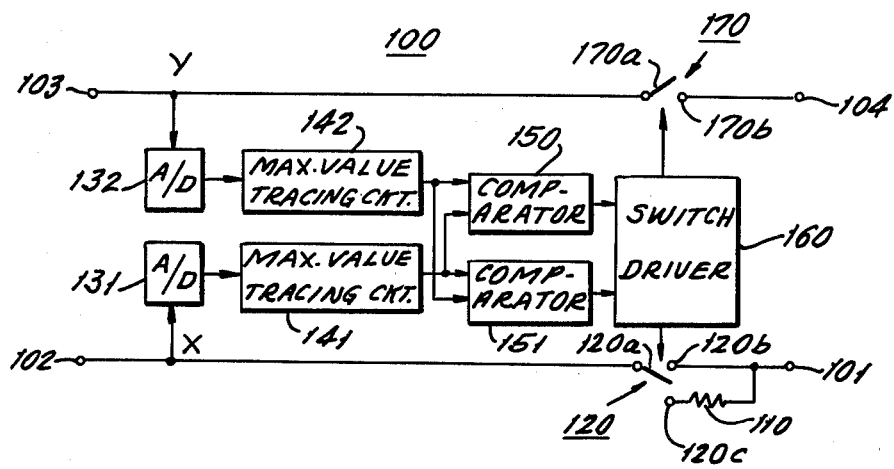
FIG. 1 is a block diagram of an echo suppressor employing maximum value tracing circuits for digitized voice signals according to the present invention.

Referring now to FIG. 1 of the drawings, an echo suppressor 100 employing a maximum value tracing circuit for digitized voice signals according to the present invention is shown in a block diagram form. A receiving signal $x$ and a transmitting signal $y$ on a four-wire circuit are converted into digital signals through A-D converters 131 and 132, respectively, and are fed to maximum value tracing circuits, 141 and 142. Outputs of these maximum value tracing circuits are applied to a first comparator circuit 150 and a second comparator circuit 151, respectively, in which the receiving signal $x$ and the transmitting signal $y$ are compared with respect to their magnitude. The outputs of these comparator circuits are applied to a switch driver circuit 160 to control switches 120 and 170 inserted into the given circuits. Describing the operation of the aforementioned echo suppressor in more detail, when the receiving signal $x$ exceeds a predetermined value, it is recognized that a receiving signal exists, and thus the switch are 170a of switch 170 on the transmitting line side is disengaged from contact 170b so that an echo signal is never transmitted. However, if the transmitting signal $y$ is determined to be larger than the receiving signal $x$, then the switch arm 170a on the transmitting line side is moved into engagement with contact 170b while the switch arm 120a on the receiving line side is connected to an attenuator contact 120c, so that the transmitting signal $y$ is processed without being attenuated with a preference over the receiving signal $x$. It is a matter of course that in a communication system which transmits voice signals after digitization, the D-A converters 131 and 132 are unnecessary.

Figure 2:
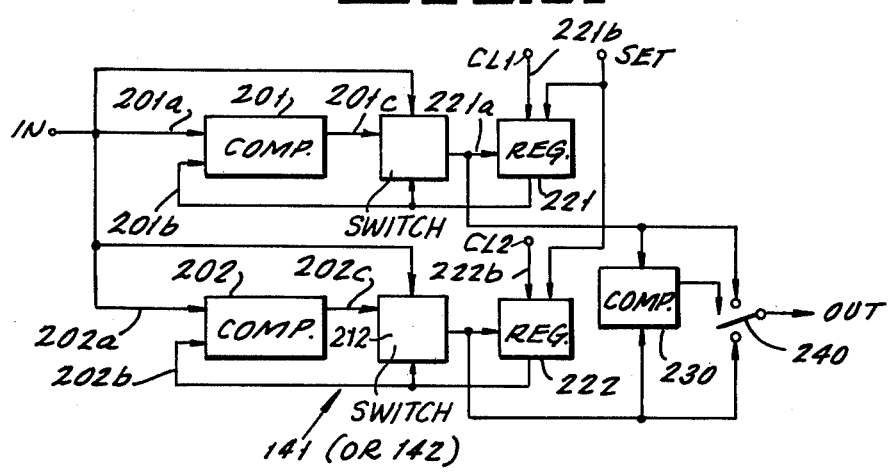
FIG. 2 shows a first preferred embodiment of a maximum value tracing circuit for digitized voice signals according to the present invention.
Figure 3:
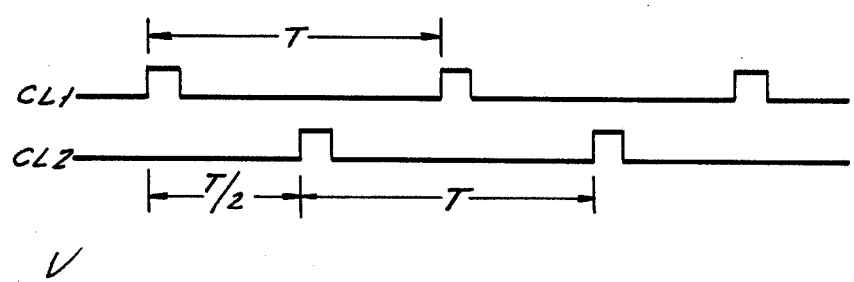
FIG. 3 is a timing diagram of clear signals to be used in the embodiment shown in FIG. 2.

With reference to FIG. 2, one preferred embodiment of the maximum value tracing circuit for digitized voice signals 141 (or 142) according to the present invention that is used in the echo suppressor shown in FIG. 1, is illustrated in a block diagram form. Explaining now the block diagram in FIG. 2 in conjunction with FIG. 3 which shows clear signals to be used in the maximum value tracing circuit and with FIG. 4 which shows signal waveforms appearing at various points in the maximum value tracing circuit, an input signal such as a digitized voice signal is applied to comparator circuits 201 and 202. In the first comparator circuit 201, an absolute value of the input signal applied at 201a and an output value of a first register 221 applied at 201b are compared to each other for controlling a first electronic switch 211 (by output 201c), so that it functions in such a manner that a larger signal of the absolute value of the input signal and the output signal of the first register 221 may be fed to input 221a of the first register 221. In addition, by making use of the second comparator circuit 202 and the second switch circuit 212, a larger signal of an absolute value of the input signal and an output signal of a second register 222 (applied respectively at inputs 202a and 202b) is written into the second register 222. Accordingly, the first register 221 and the second register 222, respectively, store maximum absolute values of the input signal in the time intervals after clear operations are initiated by respective clear signals CL1 and CL2, and thus the comparator circuit 201, electronic switching 211 and register 221 jointly constitute a first maximum value extraction circuit, while the comparator circuit 202, switching circuit 212 and register 222 jointly constitute a second maximum value extraction circuit. In the illustrated embodiment, as shown in FIG. 3, a clear signal represented by CL1 is applied to the clear input 221b of first register 221 with a time interval T, while another clear signal CL2 with the same time interval but delayed from the clear signal CL1 by T/2 is applied to the second register 222. Thereafter, the first and second registers 221 and 222 would continue to trace maximum values starting from zero at every period T.

In FIG. 4, it is assumed that the absolute value of the input signal is represented as shown at A, then the output values of the first register 221 and the output value of the second register 222 would become as shown at B and C, respectively. Returning to FIG. 2, a comparator-selector circuit is composed of a third comparator circuit 230 and a third switch 240, and this comparator-selector circuit derives at its output the larger signal of one of the output signals of the first and second electronic switches 211 and 212. Accordingly, the signal appearing at the output terminal of switch 240 is a signal represented by a solid line curve at D in FIG. 4. A broken line at D represents an envelope of peak values of the input signal A. In the illustrated example, the delay in detection is equal to zero, the hang-over time is equal to T at maximum and to T/2 at minimum, and thus FIG. 4 shows that the maximum value tracing circuit having an average hang-over time of $T \times 3/4$ can be obtained.

The essential condition required for the period T of the clear signals CL1 and CL2 is that it needs to be somewhat longer than a pitch period of a voice but an extremely long period with respect to the pitch period, for instance, a period more than ten times as long as the pitch period, should be avoided. In the echo suppressor shown in FIG. 1, the hang-over time of the maximum value tracing circuit 141 on the receiving side is desirably about 30 – 40 milliseconds, and the hang-over time of the maximum value tracing circuit 142 on the transmitting side is desirably almost zero. Such performance falls within a feasible range for the embodiment illustrated in FIG. 2. The reason why the maximum value tracing circuit 141 on the receiver side needs to have a hang-over time, is due to the fact that if the receiving signal has a time delay across the echo path between terminals 102 – 103, even if a signal level transmitting line should become higher than a signal level receiving line at the termination of a remote talker's voice, the switches 120 and 170 must not be transferred. For the aforementioned reason, the illustrated embodiment in FIG. 1 is necessarily provided with two kinds of clear signals, of which one clear signal for the maximum value tracing circuit on the receiving side has a period of about 50 milliseconds and the other clear signal for the maximum value tracing circuit on the transmitting side has a period of about 15 milliseconds. In the case when the circuit receives large impulsive noises, preliminarily carrying out an integrating operation upon the input signal and then applying the integrated signal to the maximum value tracing circuit according to the present invention, will render the echo suppressor insensitive to noise although its response speed is lowered.

In addition, although the illustrated embodiment is constructed in a digital manner, it is, of course, possible to realize a similar echo suppressor by making use of analog circuits except for the difficulties relating to precision and stability.

Figure 7:
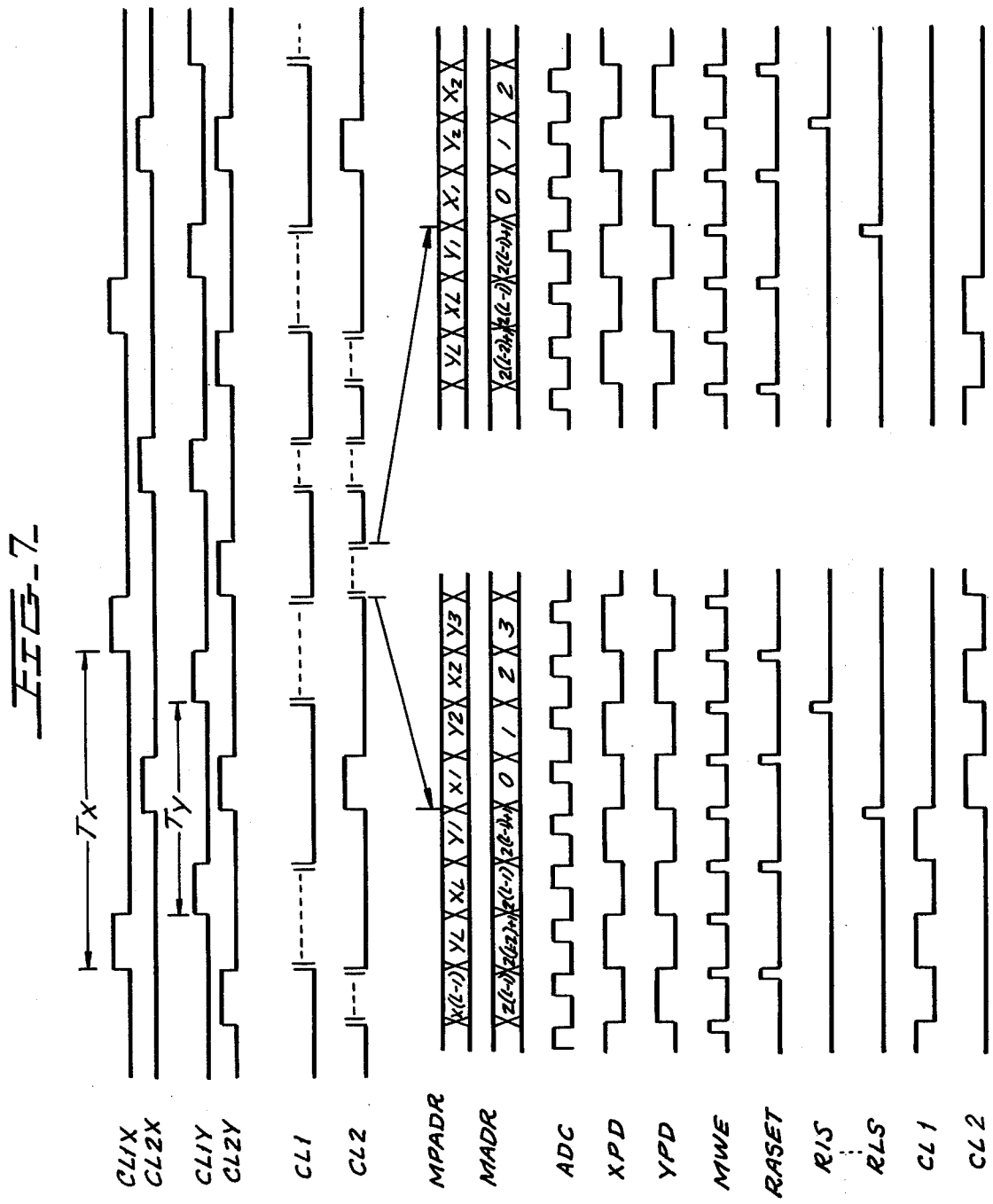
FIG. 7 is a timing diagram of the signals appearing at various points in the circuits shown in FIGS. 5 and 6.

Referring now to FIGS. 5–7 of the drawings, an example of application of the principles of the present invention to a multiplex circuit echo suppressor is illustrated. One example of a multiplex echo suppressor is shown in FIG. 5 in a block form, and one preferred embodiment of the present invention is shown in FIG. 6, in which a multiplex processor circuit 595 in the echo suppressor shown in FIG. 5 is constructed by making use of the maximum value tracing circuit according to the present invention. Furthermore, a timing diagram of the signals appearing at various points in the circuits shown in FIGS. 5 and 6 is shown in FIG. 7.

In the circuit arrangement shown in FIG. 5, all the receiving signals and transmitting signals of the respective circuits are applied to the multiplexer 580 in which the respective signals are selected in sequence as shown in MPADR in FIG. 7 and then applied to a multiplex processor circuit 595 via an A–D converter 585. The multiplex processor circuit 595 performs the same operation as that described in connection to the aforementioned first embodiment of the invention with respect to each circuit within a limited short period of time. The details of the circuit construction of the multiplex processor circuit 595 is illustrated in FIG. 6.

In the illustrated embodiment of the multiplex processing maximum value tracing circuit, place of the registers 221 and 222 in the maximum value tracing circuit shown in FIG. 2, a memory device 600 is employed. Assuming now that there exist L four wire-circuits, then determination must be made with respect to the L circuits within one sampling period. More particularly, within the time region where a signal YPD shown in FIG. 7 is in the binary 1 state, maximum value extraction for a transmitting signal is carrier out, while within the time region where a signal XPD shown in FIG. 7 is in the binary 1 state, maximum value extraction for a receiving signal as well as comparison in level between the transmitting and receiving signals are carried out, and thereby processing of the L circuits can be completed within one sampling period. Upon carrying out determination with respect to an l-th one said L circuits, after A-D conversion for the transmitting signal $y\ l$ of the $l$-th circuit has been preliminarily completed, maximum values M1yl and M2yl within a finite period in the past are read out of a $2(l-1)$-th address of the memory 600 and compared with the A-D converted value by means of comparators 611 and 612. The larger signals are selected by means of switches 621 and 622 and rewritten in the memory 600 via gate circuits 651 and 652, respectively. Similtaneously therewith, a larger one of the signals by the switches 621 and 622, that is, a maximum value is selected by means of a comparator circuit 630 and a switch 640 and is stored in register 660. In addition, during this period of time, A-D conversion for an $l$-th receiver side signal $x\ l$ is carried out. At the time point when the above-described operation had finished, maximum values $M_{1xl}$ and $M_{2xl}$ in the past of the signal $x\ l$ are read out of a $[2(l-1) + 1]$-th address of the memory 600, and a maximum value of the signal $x\ l$ is selected by the switch 640 through a similar operation to that for the signal $y\ l$. Now a maximum value of the signal $y\ l$ is stored in the register 660, and therefore, determination for the magnitudes of the levels of the transmitting and the receiving signal can be performed through comparison in magnitude between the output of the switch 640 and the output of the register 660 by means of a comparator 680. In addition, the existence of a receiving signal can be determined by comparing the maximum value of $x\ l$ with the predetermined threshold level at comparator 670. A multi-channel switch driver circuit 690 responds to the outputs of the above-described comparators 670 and 680 for transferring an instruction for opening or closing a circuit switch to a register 571 provided for each circuit. As shown in FIG. 7, the address signal MADR to the memory device 600 where read-out and write-in operations are preformed and the channel signal MPADR which is allotting a channel to the multiplexer 580 are deviated by one clock time. However, if the A-D converter circuit is of sufficiently high speed, this deviation is not always necessary.

In the illustrated embodiment, the clear signals for the maximum value extraction circuits are signals respresented by CL1 and CL2 in FIG. 7. These signals CL1 and CL2 are generated according to the following logical (Boolean algebra) equations:

CL1 = CL1X . XPD + CL1Y . YPD

CL2 = CL2X . XPD + CL2Y . YPD where . represents an operator for logical product and + represents an operator for logical sum. In the case of this embodiment, in order to achieve multiplex processing of L circuits each consisting of a receiver side circuit and a transmitter side circuit, the clear signals generated according to the above equations are used. In FIG. 7, waveforms CL1X and CL2X represent a set of clear signals for the maximum value extraction circuits on the receiver side, and waveforms CL1Y and CL2Y represent a set of clear signals for the maximum value extraction circuits on the transmitting side. Each set of clear signals are required to have a timing relation similar to the case of the clear signals CL1 and CL2 used in the first embodiment shown in FIG. 2. More particularly, it is required that the clear signals CL1X and CL2X should have the same period Tx and should be phase-shifted by 180° with respect to each other. This relationship is also true for the clear signals CL1Y and CL2Y. The maximum value extraction circuit on the receiving line side is supplied with the clear signals only in the time region where the waveform XPD is 1, while the maximum value extraction circuit on the transmitting line side is supplied with the clear signals only in the time region where the waveform YPD is 1. Consequently, the clear signals for the maximum value extraction circuits in this embodiment take the forms of CL1X . XPD + CL1Y . YPD and CL2X . XPD + CL2Y . YPD respectively.

While the signals CL1 and CL2 in the maximum value extraction circuits shown in FIG. 2 are used as clear signals for the registers 221 and 222, respectively, in the maximum value extraction circuits for a multiplex circuit shown in FIG. 6 the clear signals CL1 and CL2 function to inhibit gate circuits 651 and 652 for writing zero in the memory device 600. In addition, signals RASET and R $l$ S are signals for controlling write-in operations to the register 660 and the registers 57$l$ ($l$=1, 2, . . . ,L), respectively. Naturally, the switches used in the multiplex processor circuit 595 are constucted of gates or multiplexers.

In the illustrated embodiment, each circuit is provided with only switches 54$l$ and 55$l$ on the receiving and transmitting line, respectively, and a register 57$l$. The multiplexer 580, A-D converter 585, multiplex processor circuit 595 and control circuit 590 are used in common with all the L circuits. The multiplex processor circuit 595 is constructed as shown in FIG. 6, the control circuit 590 is a simple circuit which merely generates the various signals shown in FIG. 7, and therefore, the common part is very small in size if calculated in terms of a size per unit circuit.

Referring now to FIG. 8 of the drawings, a second preferred embodiment of a maximum value tracing circuit for digitized voice signals according to the present invention, which is constructed with only a single value extraction circuit, is illustrated in a block diagram form. The maximum value extraction circuit 802 comprises a first comparator 810, a first register 811 and a first electronic switch 812 similar to those shown in FIG. 2, and its operation is also similar to that described with reference to FIG. 2. Accordingly, the output value of the maximum value extraction circuit 802 gives a maximum value of the digital input signal during the period from the application of a clear signal CL1 up to the present. The output of the maximum value extraction circuit 802 is connected to a second register 803, which stores the output value of the maximum value extraction circuit 802 in synchronism with a set signal S1. The time point for applying the set signal pulse S1 to the second register 803 is selected at a time point just prior to the application of the clear signal CL1 to the first register 811. The contents of the second register 803 are therefore made equal to the output value of the maximum value extraction circuit 802 at the time point just prior to the clear operation of the first register 811. An output value of the second register 803 and the output value of the maximum value extraction circuit 802 are fed to a second comparator circuit 804, in which these two output values are compared in magnitude to each other. An output of the second comparator circuit 804 controls a second electronic switch 808, so that the output value determined by the second comparator circuit 804 and the larger of the two values is stored in a third register 805. Owing to the above-described circuit arrangement, the value obtained at the output of the third register 805 corresponds to an envelope value of the input signal prior to the conversion into a digital form, in other words, a value corresponding to the maximum value.

Operation of the above-described embodiment will be described in more detail with reference to FIG. 9, which represents the signals appearing at various points in the maximum value tracing circuit illustrated in FIG. 8. As an input signal, a signal obtained by converting a voice signal shown at (a) into a digital form is supplied to an input terminal 801. Then the output value of the maximum value extraction circuit 802 takes a waveform (one illustrated in analog form converted from real digital signals identical to those in (c) and (d) as shown at (b). At (f) is shown a clear pulse series CL1 for clearing the first register 811 in the maximum value extraction circuit 802. Also at (e) is shown a set pulse series S1 for setting the second register 803 at the output value of the maximum value extraction circuit 802. The waveform shown at (c) represents the value stored in the second register 803, that is, the output value of the second register 803 at the time just before it is cleared. Finally, at (d) is shown a waveform which is comprised of a series of successively larger values of the output value of the second register 803 represented at (b) and the output value of the maximum value extraction circuit 802 represented at (c). In other words, the output value of the third register 805, or one example of the output signal from the maximum value tracing circuit according to the present invention, is shown at (d) in FIG. 9.

In the above-described embodiment, a description has been given, for the simplicity of explanation, assuming that the time point for applying a clear pulse CL1 to the first register 811 and the time point for applying a set pulse S1 to the second register 803 are not coincident. However, if the first register 811 has a construction such that the clear pulse CL1 can be delayed therein, then it is a matter of course that the time points for applying the clear pulse CL1 and the set pulse S1 could be coincident with each other.

As described above, according to the second embodiment of the invention shown in FIGS. 8 and 9, a maximum value tracing circuit can be constructed including only a single maximum value extraction circuit, so that an envelope value of an input signal, that is, a signal consisting of a series of maximum values within successive short time regions can be obtained. Therefore, it results in a great advantage for the simplification of various equipment which requires tracing of maximum values.

What is claimed is:

1. A maximum value extraction circuit for extracting the peak value of an input signal of varying value, which input signal is periodically digitized, said circuit comprising:
   primary input means for receiving said digitized input signal;
   register means for storing the last digital signal applied to its input terminal means such that a new digital signal is stored by said register means each time a new digital signal is applied to its input terminal means;
   means for comparing the digital signal stored by said register means to the last digital signal received by said primary input means and for generating a switch control signal indicative of which of the signals last compared by said comparing means is larger; and
   switch means responsive to said switch control signal for applying the larger of the two signals last compared by said comparing means to said input terminal means of said register means.

2. A maximum value tracing circuit for extracting the peak value of an input signal of varying value, said input signal being digitized a plurality of times during each of a plurality of successive time periods, said tracing circuit comprising:
   primary input means for receiving said periodically digitized signal;
   first memory means for storing the last digital signal applied to its input terminal means and for clearing any signal stored therein at the end of each of said plurality of successive time periods;
   first comparing means for comparing the digital signal stored in said first memory means to the last digital signal received by said primary input means and for generating a first control identifying the larger of the two signals last compared by said first comparing means; first switch means responsive to said first control signal for applying the larger of the two signals last compared by said first comparing means to said input terminal means of said first memory means; stored in said first memory means just prior to the end of the last of said successive time periods;
   third memory means for storing the last digitized signal applied to its input terminal means;
   second comparing means for comparing the digital signal stored in said second memory means to the digital signal stores in said first memory means and for generating a second control signal identifying the larger of the two signals last compared by said second comparing means; and
   second switch means responsive to said second control signal for applying the larger of the two signals last compared by said second comparing means to said input terminal means of said third memory means.

3. A maximum value tracing circuit for extracting a peak value of an input signal of varying value, said input signal being periodically digitized, said tracing circuit comprising:
   primary input means for receiving said periodically digitized signal;
   first memory means for storing the last digital signal applied to its input terminal means and for clearing any signal stored therein at the end of each of a plurality of successive first time periods, said input signal being digitized a plurality of times during each of said first time periods;
   first comparing means for comparing the digital signal stored in said first memory means to the last digital signal received by said primary input means and for generating a first control signal identifying the larger of the two signals last compared by said first comparing means;

first switch means responsive to said first control signal for applying the larger of the two signals last compared by said first comparing means to said input terminal means of said first memory means;

second memory means for storing the last digital signal applied to its input terminal means for clearing any signal stored therein at the end of each of a plurality of successive second time periods, each of said second time periods being of the same duration as each of said first time periods, the end of each of said second time periods being offset with respect to the end of each of said first time periods;

second comparing means for comparing the digital signal stored in said second memory means to the last digital signal received by said primary input means and for generating a second control signal identifying the larger of the two signals last compared by said second comparing means; output means; second switch means responsive to said second control signal for applying the larger of the two signals last compared by said second comparing means to said input terminal means of said second memory means;

third comparing means for comparing the digital signals resulting from the last comparison operations of said first and said second comparing means and appearing at the outputs of said first and said switch means and for generating a third control signal identifying the larger of the two signals last compared by said third comparing means; and third switch means responsive to said third control signal for applying the larger of the two signals last compared by said third comparing means to said output means.

* * * * *